June 5, 1962  E. P. AGHNIDES  3,037,513
ASH TRAY WITH IMPROVED MEANS FOR EXTINGUISHING CIGARETTES
Original Filed July 29, 1952

INVENTOR
Elie P. Aghnides

BY  *Moore & Hall*

ATTORNEYS

United States Patent Office 3,037,513
Patented June 5, 1962

3,037,513
ASH TRAY WITH IMPROVED MEANS FOR EXTINGUISHING CIGARETTES
Elie P. Aghnides, 46 W. 54th St., New York 19, N.Y.
Continuation of application Ser. No. 301,517, July 29, 1952. This application Oct. 29, 1957, Ser. No. 693,110
5 Claims. (Cl. 131—235)

This invention relates to ash trays of the type having means for extinguishing cigarettes placed in it. This application is a continuation of my United States application Serial No. 301,517 filed July 29, 1952, for Ash Tray With Improved Means for Extinguishing Cigarettes and now abandoned, and a continuation-in-part of my copending application Serial No. 183,542, filed September 3, 1950, now United States Patent No. 2,710,611, granted June 14, 1955.

It is well known in the prior art that ash trays may be provided with small cavities in which the smoker many crush a cigarette butt in order to extinguish same. It is also known that a deep hole may be provided into which cigarettes may be dropped in order to extinguish them. These prior art constructions either are unsafe and create fire hazards or are not convenient to use. Moreover, cleaning is difficult.

In the prior art it has been known that two circular bowls may be employed, one of which rests inside the other, the inner bowl having grooves vertically disposed along its outer side wall and the outer bowl having complementary grooves along its inner side wall. The bowls must be correctly aligned so that the grooves in the one bowl will cooperate with those in the other bowl to form the desired deep cavities. Aligning means was employed to secure cooperation of the two sets of grooves but it was often necessary to rotate the inner bowl through a large angle before the aligning means would effect the desired alignment.

One object of this invention is to overcome the disadvantages stated above as existing in the prior art.

Another object of this invention is to provide improvements in the means for aligning the bowls in the above-described type of ash tray.

Other objects and advantages of the invention will appear as this description proceeds.

In carrying out the foregoing objects, one of the bowls has aligning means in one of its grooves that may fit in any one of the grooves of the other bowl. Further details will appear as this description proceeds.

Figure 1:
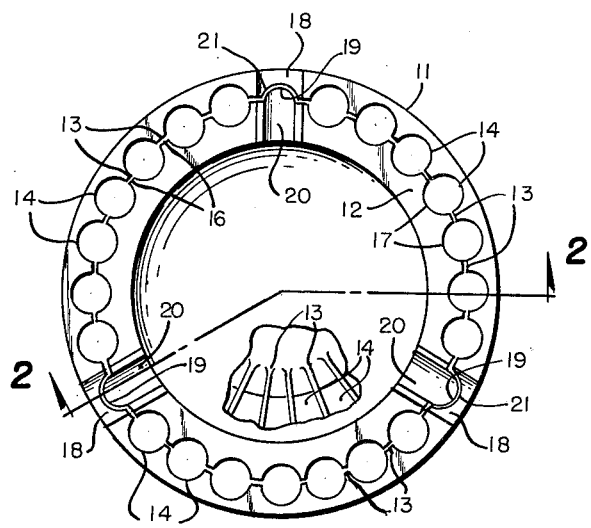
FIGURE 1 represents a top elevational view and partial sectional view of the improved ash tray.
Figures 2, 3:
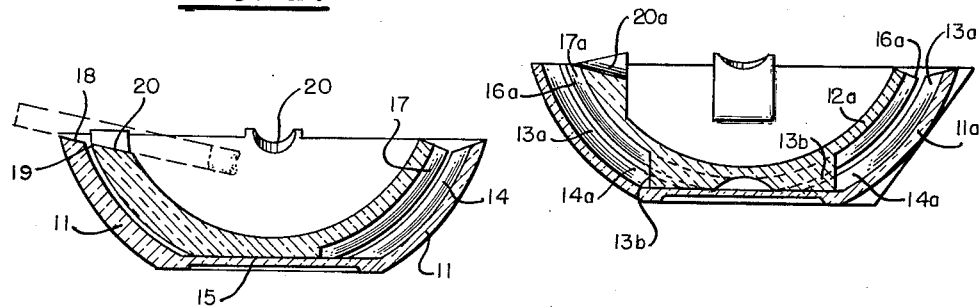
FIGURE 2 represents a sectional view of the ash tray along line 2—2 of FIGURE 1.
FIGURE 3 is a sectional view similar to FIGURE 2 of a modified form of the ash tray shown in FIG. 1.

Referring first to FIGURES 1 and 2, I have shown a preferred embodiment of the invention. The ash tray includes two nested superposed members 11 and 12, each of which is basically of bowl shape. The lower bowl 11 has a plurality of webs 13 only a few of which are indicated by numeral, on its inner surface. Webs 13 are so shaped as to form the concave surfaces 14, the overall structure therefor being a bowl having a plurality of smooth concave surfaces on its inner surface. The webs 13 extend radially on the inner surface of bowl 11, almost converging near the center 15 of the bowl. The inner bowl 12 has a plurality of webs 16 on its outer surface, the webs 13 and the surfaces 14 facing respectively the webs 16 and the surfaces 17 when the two parts are properly nested.

The bowl 12 being of lesser diameter than bowl 11, the upper bowl can readily be placed within the lower bowl. Symmetrically disposed about the upper surface of the bowls are cigarette rests 20. Each of these rests has a groove 18, a recess 21, and a tongue 19. The cigarette rests are so disposed about the ash tray that when the two bowls 11 and 12 are superposed, the tongues 19 are received by the recesses 21 and hold the bowls 11 and 12 in predetermined relative positions. These positions are such because of the symmetrical disposition of cigarette rests, webbings and smooth surfaces, that individual webbings 13 and 16 are respectively aligned, and the smooth surfaces 14 and 17 thereby form a plurality of cavities for the reception and extinction of cigarettes.

In FIGURES 1 and 2 the tongues 19 form the aligning means and are arranged to fit in any of the grooves of the outer element 11.

In FIGURE 3, which is a cross-sectional view of a modified form of the ash tray shown in FIG. 1 and taken along a section line corresponding to that provided for the cross-sectional view of FIG. 2, the aligning means is on the bottom of the inner bowl 12a. The aligning means takes the form of projections 13b adapted to fit in the grooves formed in outer bowl 11a by the webs 13a. As a result, when bowl 12a is dropped in bowl 11a, the webs 13a and 16a face each other and it is usually unnecessary to manually rotate the inner bowl to effect alignment. However, if such manual rotation is necessary, only a few degrees are required.

In FIGURE 3 the cigarette rest 20a replaces the cigarette rest 18—20 of FIGURE 1. The parts of FIGURE 3 bear similar reference numbers to similar parts of FIGURE 1 except that the subscript "a" has been added. The outer bowl 11a is upwardly curving and provided with curved rib members 13a on its inner surface. An inner curved bowl 12a being of smaller diameter, fits within outer bowl 11a and carries rib members or webs 16a on its outer surface which mate with rib members 13a to form curved cigarette snuffing cavities 14a therebetween. Cigarette rests 20a are positioned at convenient points around the edge of the inner bowl. Projection lugs 13b are carried by inner bowl 12a and slide readily between the web portions 13a and serve to align the webs or rib members 13a and 16a to assure the effective formation of cavities 14a when bowl 12a is dropped within bowl 11a.

Since the rib members radiate from the center of the bowls, they provide tapered cavities such as that shown in the sectioned portion of FIGURE 1.

I claim:

1. An ash tray comprising an outer element having an outer wall and an inner removable element having an outside wall of the same general contour as the inner face of the outer wall of the outer element, the outer wall of said inner element and the inner wall of said outer element cooperating to provide a plurality of extinguishing wells therebetween comprising spaced grooved walls serving to guide a cigarette, the grooves in said grooved walls tapering radially inwardly toward the centers of said elements and tapered aligning means carried by one of said elements which fits in any of the grooves formed by said spaced grooved walls in the other of said elements to align the corresponding grooved walls on said inner and outer elements and aligns the two elements so that the complementary grooves thereof are positioned to co-act and form extinguishing wells, said elements being separable by vertically moving the inner removable element with respect to the outer element and being automatically self-aligning under the action of gravity to form said extinguishing wells.

2. The combination set forth in claim 1, said aligning means comprising at least one lug on one of said elements located between said grooved walls, said lug being so positioned that when the inner element is dropped into the outer element, the grooves in the grooved walls forming the extinguishing wells face each other automatically in radial alignment as the lug slides and fits into any one of the grooves formed by said grooved walls on the other element.

3. An ash tray comprising an outer element having an inner wall having ribs therearound each in a plane generally normal to the base of said outer element and an inner removable element having an outer wall of the same general contour as the said ribbed wall of said outer elements and having corresponding ribs therearound, said ribs inclining downwardly and substantially radially inwardly toward the bottom of said tray, said ribbed walls cooperating to form extinguishing wells for cigarettes, and aligning means carried by one of said elements which fits between any two adjacent ribs in the ribbed wall of the other element, at random around the wall thereof, to align corresponding ribs on both elements to form said extinguishing wells.

4. An ash tray comprising an outer element having an upwardly inclined outer wall and an inner removable element having an outside wall of the same general contour as the inner face of the outer wall of the outer element, the outer wall of said inner element and the inner wall of said outer element each having grooves cooperating with corresponding grooves in the other element to provide a plurality of extinguishing wells therebetween comprising spaced, movable walls serving to guide a cigarette, the grooves in said grooved walls tapering radially inwardly toward the bottom of said elements, said grooves providing inclined and curved tapered cavities of smaller cross-section at the lower portion thereof, means on one of said elements comprising a projecting lug adapted to fit in a groove on the other of said elements, said inclined cavities being formed when said inner element with said projecting lug fitting into any groove on said other element is nested within said outer element whereby an ash tray of given cigarette capacity may be constructed with decreased overall height of tray as compared to that required if said cavities were not slanted, said inclined, curved, tapering cavities serving to extinguish inserted cigarette butts whereby a readily separable and easily cleaned tray with partial relatively shallow webs tapering in width from top to bottom, cooperate to form said extinguishing wells.

5. The combination set forth in claim 4, said inner and outer elements being circular and readily relatively rotatable about a common axis whereby the insertion of a cigarette into a partially formed well resulting from imperfect alignment of said inner and outer elements will produce a slight relative movement of rotation of said elements to cause said projecting lug to slide into an adjacent groove on said other member to thereby cause said partial webs of each element to align with those of the other and to complete the formation of said inclined, curved, tapering extinguishing wells, said partial webs cooperating with an inserted cigarette to lock the relative position of said outer and inner elements.

References Cited in the file of this patent

UNITED STATES PATENTS

| | | |
|---|---|---|
| D. 128,036 | Aghnides | July 1, 1941 |
| 117,766 | Gibson | Aug. 8, 1871 |
| 2,281,720 | Shefts | May 5, 1942 |

FOREIGN PATENTS

| | | |
|---|---|---|
| 299,186 | Great Britain | Oct. 25, 1928 |
| 422,431 | Great Britain | Jan. 11, 1935 |
| 622,506 | Great Britain | May 3, 1949 |
| 629,810 | Great Britain | Sept. 28, 1949 |